June 23, 1959     W. A. BUTKUS     2,891,827
FLEXIBLE SEAL
Filed April 12, 1957
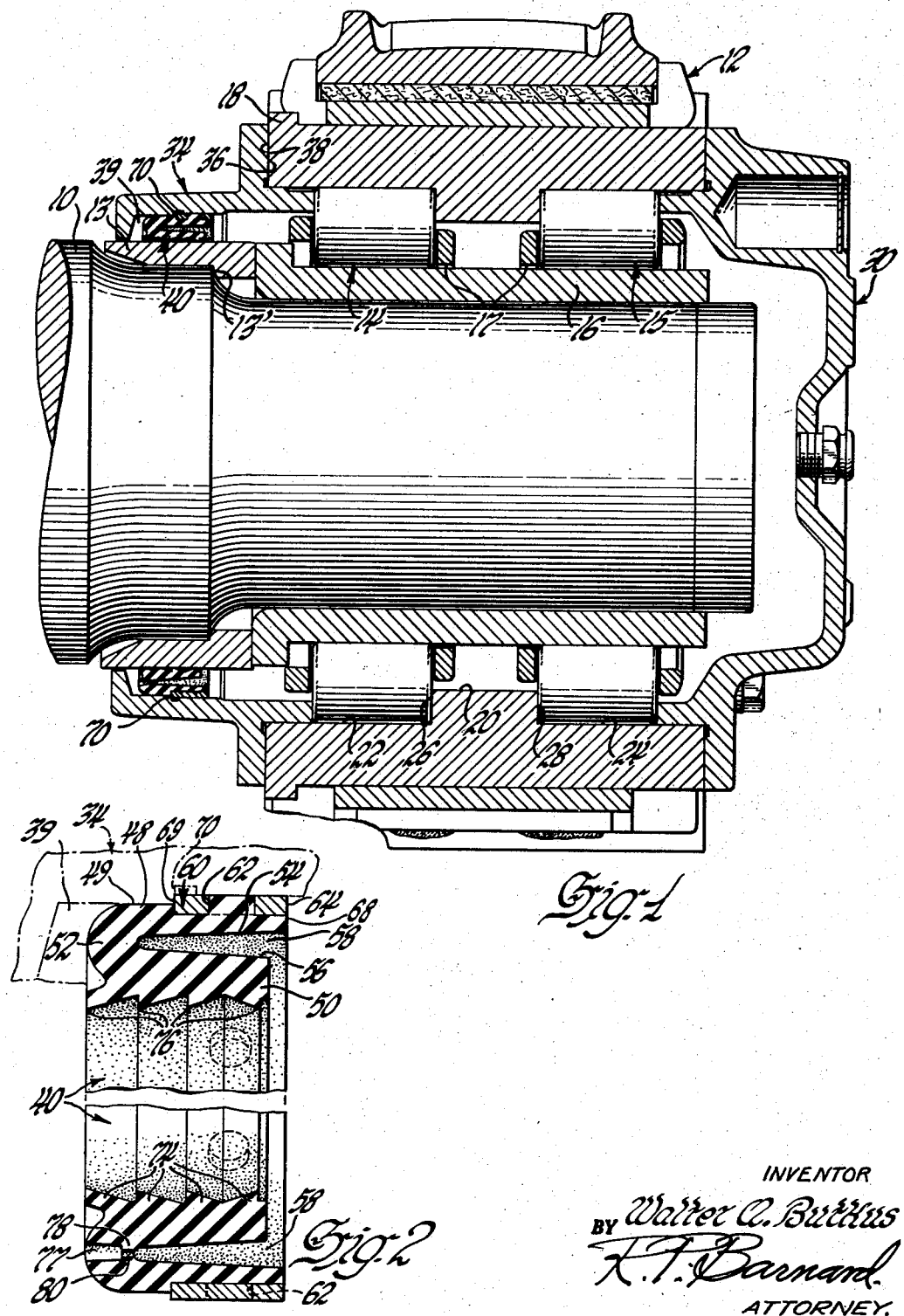
INVENTOR
*Walter A. Butkus*
BY *R. F. Barnard*
ATTORNEY.

United States Patent Office 2,891,827
Patented June 23, 1959

2,891,827

FLEXIBLE SEAL

Walter A. Butkus, Kearny, N.J., assignor to General Motors Corporation, Detroit, Mich., a corporation of Delaware Application April 12, 1957, Serial No. 652,488

3 Claims. (Cl. 308—180)

The present invention relates to a flexible seal. The subject seal is an improvement over the seal shown in copending application No. 652,487 of Richard J. Brittain, Jr., and which latter type seal increases its sealing action with an increase in the pressure of the lubricant which it is adapted to contain.

When such seals are used in combination with rotating shafts, it is apparent that it is desirable to use no greater wiping pressure between the seal and the rotating surface than is necessary to retain the lubricant within a bearing. To use unnecessarily high wiping pressures results in excessive wear of the seal. On the other hand too light wiping pressures will result in the leakage of lubricant past the seal. Thus as the pressure of the lubricant increases and with it the tendency towards leakage, the wiping pressure between the subject type seal and the cooperating rotating member also increases to maintain a suitable sealing relationship.

The present device represents an improvement in the aforenoted Brittain type seal in the disposition of a reinforcing ring on the seal in a manner to achieve certain results not heretofore obtained and contribute further to added seal life.

In the present seal the metal reinforcing ring is uniquely mounted on the radially outer seal surface so that the seal is mounted within the bearing upon the metal surface of the ring resulting in less wear to the flexible material portion of the seal and greater seal rigidity at a point where flexure is of relatively little importance.

In addition, the disposition of the reinforcing ring on the outer or mounting seal surface is such that the metal ring extends radially beyond the body of the seal in a manner to retain the seal to the supporting bearing member against the axial displacing pressures of the lubricant contained by the seal. In this way the wear life of the seal is enhanced since seal supporting wear is taken by a metallic member.

The details as well as other objects and advantages of the subject improved seal construction will be apparent from the following description.

In the drawing:

Figure 1 shows a partially sectioned view of a journal box embodying the subject seal; and Figure 2 is an enlarged sectional view of the seal.

To better appreciate the operation of the subject flexible seal it has been shown and will be described in the environment of a journal box with which it may be utilized.

An axle 10 is rotatably disposed for anti-frictional rotation in a journal box 12. The axle supports the journal box 12 upon two similar rows of bearing rollers 14 and 15 which are free to roll upon the hardened cylindrical periphery of an inner raceway sleeve 16 presssed over a reduced end of the axle. The inner end of sleeve 16 is in abutting relation with a seal ring member 13, the latter which is mounted upon an enlarged portion of the axle and abutting thereagainst through a shoulder 13'.

The rollers of each row are circumferentially spaced by rotatable annular cages 17.

A housing 18 has a through bore 20 and has ground counterbores at each end that provide cylindrical raceways 22 and 24 against which the sets of roller elements 14 and 15 may respectively roll. These raceways may be heat treated as by induction hardening or by other suitable hardening operations to provide hard wear-resistant surfaces. The axially outer end of the raceway 22 terminates in an annular shoulder 26 for engagement with the flat ends of the rollers 14 and a similar annular shoulder 28 at the inner end of raceway 24 provides an abutment for the ends of rollers 15.

A front end cap 30 is provided for enclosing the end of the journal box. The end cap 30 is removably mounted on the housing 18 by suitably provided studs, not shown. A rear cap 34, demountably secured to housing 18 by bolts or screws and surrounding the seal ring 13 in slightly spaced relation, has an annular flat wall 36 abutting against the rear wall 38 of housing 18.

An annular chamber 39 is formed in the interior surface of cap 34 and is adapted to support a flexible seal 40 therein. Seal 40 is made of any of the well known natural or synthetic materials able to withstand the deleterious effects of lubricants and the other rigors to which seals adapted for use in bearing devices are subjected.

Referring to Figure 2, the flexible seal 40 is of an annular configuration and includes a pair of coaxially related axially extending lips 48 and 50. The lips 48 and 50 are joined by a portion 52 about which the lips are adapted to flex. The outer surface of lip 48 is generally cylindrical in form. The inner surfaces 54 and 56 of the lips taper toward the open end of the seal and define therebetween a lubricant chamber 58.

The outer cylindrical surface of lip 48 has a reinforcing ring 60 bonded thereon. The reinforcing ring 60 has a plurality of circumferentially disposed holes 62 therein into which the flexible sealing material may flow during bonding in order to secure the ring to lip 48. The inner end 64 of ring 60 terminates substantially in the same radial plane as the inner end 68 of lip 48 and in so doing provides radial support for the inner or free end of the lip. The width of ring 60 is such that it extends over a major portion of the length of the lubricant chamber 58.

It is important to note that in bonding ring 60 to lip 48 of the seal the ring is only partially embedded in the lip. This is done for the purpose of insuring that a portion 69 of the inner radial face of the ring projects above the outer face 49 of lip 48. The end cap 34 is internally radially relieved to provide a seal retaining shoulder 70 against which ring portion 69 is adapted to abut. Thus axial pressures created by the lubricant within the journal box tending to push out the seal will be taken by the reinforcing ring and transmitted to member 34.

Also bonding ring 60 to the outer surface of lip 48 insures that the seal will be supported upon end cap 34 through the metal surface of the ring. In thus positioning the ring 60 on the outer surface of lip 48 the seal reinforcing function of the earlier Brittain design is not in any way sacrificed and the added advantages of supporting the seal and transmitting certain loads imposed thereon through this ring adds further to the flexible seal life already significantly lengthened by the Brittain construction.

The radially inner surface of the inner lip 50 is of a serrated cross section. This type of serrated construction results in a plurality of annular wedge shaped portions 74 normally having line contact when wipingly engaging the rotatable seal ring 13. This line contact reduces the frictional resistance to rotation and hence the wear on the seal during normal operation. The wedge portions 74 terminate in radially inner edges 76 which are coaxial and radially equidistant from the axis of the seal.

As the axle 10 shifts axially relative to the journal housing 18 and cap 34 lubricant disposed in the bearing cavity will be displaced or pumped and its pressure thereby increased due to its containment by the seal 40. Under this condition the tendency of the lubricant to escape past the seal is also increased. To illustrate, as the axle 10 is relatively shifted to the left. as viewed in Figure 1, the lubricant pressure in the space between the left end of the bearing set 14 and seal 40 is increased thereby tending to pump lubricant past the seal. However, with the seal as presently constructed the increase in lubricant pressure is translated into increasing radial pressures acting on the inner surfaces 54 and 56 of the seal lips 48 and 50. This results in an increase in the wiping pressure between the serrated edges of the inner lip 50 and the cooperating rotating surface of seal member 13. In addition to the increase in the wiping pressure, per se, the radial pressures will tend to radially distend or flatten the serrated wedge portions 74 increasing the seal area in wiping contact with the rotating surface of seal member 13 thereby further enhancing the sealing function at a time when the propensity for leaking is greater.

In order to insure that momentary lubricant pressures do not arise which might be otherwise great enough to completely blow out the seal 40, means is provided for relieving such pressures. The pressure relieving means bleeds off lubricant when necessary to protect the seal but will not otherwise normally permit the flow of lubricant therethrough. To this end, portion 52 of seal 40 has an opening 77 molded or otherwise formed therein. Opening 77 is preferably aligned with the lubricant receiving opening 58 of the seal but is spaced from said latter opening by a wall portion 78 which has a small orifice 80 formed therethrough. Orifice 80 is of such a size that the lubricant, due to its viscosity under normal operating conditions, will not pass therethrough. If lubricant pressures momentarily build up to a value which would otherwise be likely to blow out the seal, orifice 80 will permit a limited amount of lubricant to escape until the pressure returns to a safe value. It is apparent that any number of such orifices could be provided, however, it has been found sufficient for the noted purpose to provide one such orifice in the seal.

It is apparent that various structural modifications may be made in the subject seal without departing from the spirit of the invention as set forth in the appended claims.

I claim:

1. A flexible lubricant seal comprising an inherently resilient annular member having an outer annular portion and a reentrant inner annular portion, said portions being radially spaced from each other throughout most of their lengths, the outer of said portions having a resiliently yieldable cylindrical outer surface for mounting in sealing engagement with a cylindrical wall, said member including an annular U-shaped resilient portion joining the adjacent ends of the inner and outer portions at one end of the seal to define an annular chamber therebetween having an open end, a rigid reinforcing ring bonded to the outer annular portion, one end of said ring terminating adjacent the open end of the seal member and located generally in the same radial plane as the end of the subadjacent bonded portion, the other end of said ring terminating intermediate the length of said outer annular portion and having an annular locating shoulder extending radially outwardly from said yieldable cylindrical outer surface, and said inner annular portion being serrated throughout its length and within its bore to provide a plurality of annular lips of wedge-shaped cross section, the radial inner edges of said wedge-shaped lips being coaxial and radially equidistant from the axis of the seal.

2. A flexible lubricant seal comprising an inherently resilient annular member having a pair of coaxially disposed inner and outer annular portions, said portions being radially spaced from each other throughout most of their lengths, the outer of said annular portions having a resilient yieldable cylindrical outer sealing surface, said member including an annular U-shaped resilient portion joining a pair of the adjacent ends of said coaxially disposed portions to define an annular chamber therebetween having an open end, a rigid reinforcing ring bonded to and radially projecting out of said outer portion, one end of the ring terminating adjacent the open end of the seal and located generally in the same radial plane as that of the subadjacent bonded portion, the other end of said ring terminating intermediate the length of said outer annular portion and having an annular locating shoulder extending radially outwardly from said yieldable cylindrical outer surface, the inner surface of said inner portion being serrated throughout its length to provide a plurality of axially spaced annular lips of wedge-shaped cross section having their inner edges coaxial and radially equidistant from the axis of the seal, and said annular U-shaped portion containing a passage extending therethrough and communicating with the open ended chamber, said passage being normally closed and opening under control of the pressure of lubricant within said chamber.

3. A journal box supported on a rotatable axle, said box including an outer race ring having annular raceways therein, an inner race ring fitted over the axle and having an annular raceway thereon, a series of rollers rotatably engageable with both raceways for rotatably mounting the axle within said box, a pair of axially spaced end caps surrounding the axle and closing the ends of the outer race ring, one of said end caps having a counterbore provided with an annular shoulder intermediate its ends, an inherently resilient annular seal intermediate the ends of the counterbore and having coaxial inner and outer annular portions radially spaced apart throughout most of their lengths, said seal including a resilient deformable U-shaped portion inter-connecting the adjacent ends of said annular portions to provide an annular lubricant chamber therebetween which is open at one end, the periphery of said outer annular portion having a cylindrical face resiliently and sealingly compressed against a peripheral wall of said counterbore, a reinforcing ring bonded to and partially embedded within said outer annular portion and having an annular shoulder at one end extending radially outwardly from said cylindrical face intermediate the length of the outer annular member and abutting the annular shoulder in said counterbore, and the inner annular portion of the seal having radially inwardly projecting wedge-shaped lips in yieldable sealing engagement with the axle.

References Cited in the file of this patent

UNITED STATES PATENTS

| 2,176,244 | Brittain | Oct. 17, 1939 |
| 2,676,073 | Boden | Apr. 20, 1954 |
| 2,736,585 | Riesing | Feb. 28, 1956 |
| 2,736,586 | Riesing | Feb. 28, 1956 |

FOREIGN PATENTS

| 800,550 | Germany | Nov. 13, 1950 |
| 715,982 | Great Britain | Sept. 22, 1954 |